March 15, 1938. K. E. BEMIS 2,111,021
PROCESS OF MAKING PIE CRUSTS
Filed Feb. 7, 1936
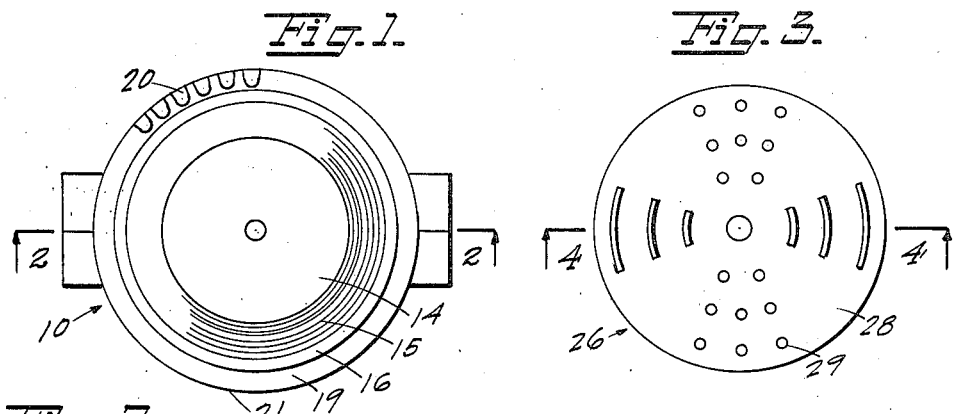
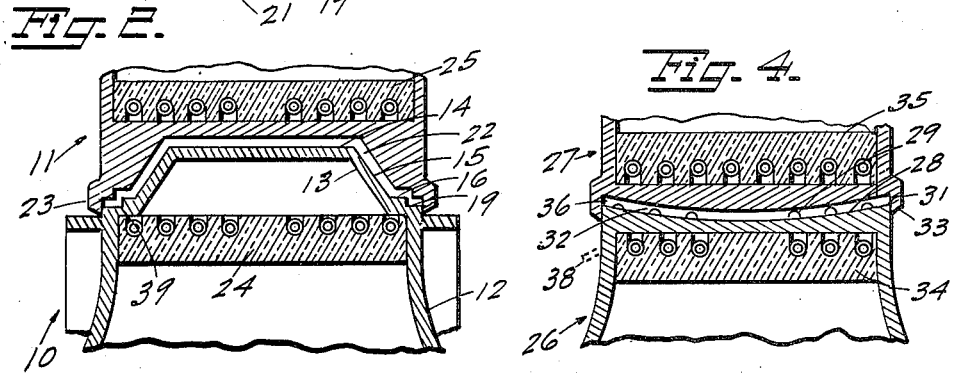
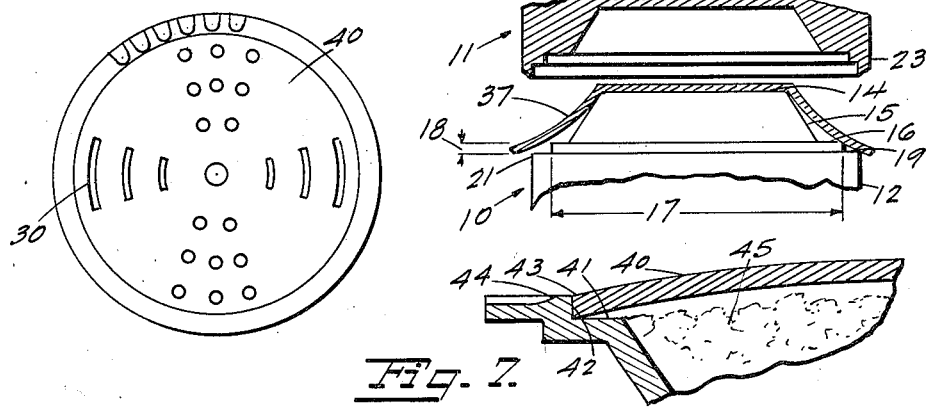
INVENTOR.

Patented Mar. 15, 1938

2,111,021

UNITED STATES PATENT OFFICE 2,111,021

PROCESS OF MAKING PIE CRUSTS

Kenneth E. Bemis, Oakland, Calif.

Application February 7, 1936, Serial No. 62,828

5 Claims. (Cl. 107—54)

This invention, a process of making pie crusts, presents decided advantages over present methods of making pies, since it removes the uncertainty of the demand for various kinds of pies, due to the fact that completed materials in unassembled form can be kept available to meet the demand for any kind of pie and in any quantity, and which demand can be met immediately on order.

Pies at present are baked in kind and number based on anticipated demand, resulting in an oversupply of some kinds and an undersupply of other kinds.

This invention assures the right number of pies irrespective of the demand and removes all guess work and obviates the possibility of left-overs, and consequent stale pies.

Furthermore, this process produces pies of uniform texture, color and form, and uses exact proportions in all pies of a predetermined size, whereby exact calculations as to cost may be made. These pies have an especially delectable appearance without any apparent indication of after-baking assembly.

This invention utilizes means for baking the pie crusts to exact form, size, and color, and one type of such means is disclosed in copending application, Serial Number 62,827 filed February 7, 1936, which application covers a Pie crust forming, trimming, and baking machine.

However, it is possible to obtain satisfactory results by other means, such as cooperative conveyor units carrying confined baking compartment elements through an oven, whereby the process would be continuous.

With this process, top crusts and bottom crusts or shells can be baked, and which will retain their crispness and freshness over extended periods, and which can be safely stored and shipped to remote points by using suitable protective packing or containers. Also, fillers of various kinds can be preserved in sealed containers holding each the proper amount of filler for one pie.

Therefore, with these top crusts, bottom crusts, metal or vitreous containers having the same internal form as the bottom crusts, and a supply of assorted fillers, any kind of pie, including covered pies, such as fruit pies; uncovered pies, such as lemon, cream or pumpkin; and meat pies, can be instantly assembled as orders are received.

The pies will all have the same size, form, color, and appearance in covered pies. Housewives can purchase the baked crusts and lay in a supply of fillers, and assemble the pies as desired. No process heretofore has presented this advantageous feature, and the process is therefore entirely new and hitherto unknown.

The objects of the invention therefore are:

First, to provide a process of making pie crusts which will produce crusts of uniform size, color, form and texture.

Second, to provide a process in which top crusts and bottom crusts are cooperative, by forming a top-crust-receiving recess in the rim portion of the bottom crust, and making the peripheral thickness of the top crust equal to the depth of the recess and the diameter such as to closely fit in the recess, while making the cross-sectional form of the top crust convexo-concave, whereby the top crust will form an unbroken surface continuation with the top surface of the rim, and the top crust will be self-supporting out of contact with the filler, and any expansion created by moisture in the filler will cause the top crust to lock in the recess.

Third, to bake the crusts in a completely confined chamber having the exact dimensions of the desired finished product and heating both sides of the chamber for simultaneously baking both sides of the crust.

Fourth, to form, trim, and bake the crust, all by the same means, and coincidently, by a single operation, whereby uniformity in the finished product is obtained.

Other objects and advantages of the invention will become apparent as the following description is read on the drawing forming a part of this specification, and in which similar reference characters are used to designate similar parts throughout the several views, of which:

Fig. 1 is a plan view of the lower element of the bottom-crust-baking unit.

Fig. 2 is a fragmentary sectional elevation through both elements of the bottom-crust-baking unit, and corresponds to a line 2—2 of Fig. 1.

Fig. 3 is a plan view of the lower element of the top-crust-baking unit.

Fig. 4 is a fragmentary sectional elevation through both elements of the top-crust-baking unit and corresponds to a line 4—4 of Fig. 3.

Fig. 5 is a sectional elevation through the upper element and through a disc of dough, with the lower element shown full, and corresponds to Fig. 2.

Fig. 6 is a plan view of a pie made according to the invention.

Fig. 7 is an enlarged fragmentary sectional elevation through the assembled pie made according to this process.

This process may be carried out in any type of device which will form and bake crusts to exact size and form, and is shown in its adaptation to the machine described in the copending application previously mentioned.

Referring to Figs. 1, 2, and 3, the bottom crust baking unit consists of two cooperative elements, indicated in their entirety as 10 and 11, which are movable relative to each other into open and closed positions, as is respectively illustrated in Figs. 5 and 2.

The lower element consists of a base 12, integral with which, or upon which is mounted a forming element 13, the main portion of which is frusto-conical in form, having a flat top surface 14 and sloping sides 15 which terminates in an encompassing recess-forming member 16, which forms a recess to a diameter 17 and with a depth 18. A rim top forming element 19 provided with undulations or serrations 20, extends beyond the recess-forming element, and the rim-forming element terminates in a trimming edge 21 for trimming the dough after forming and before baking.

The upper member 11 is spacedly complementary to the lower member 11 when in closed position, forming a completely confining baking chamber 22, which is enclosed at the periphery by the depending shear member 23 which cooperates with edge 21 for trimming.

Each element 10 and 11 has its own heating means, respectively 24 and 25 for simultaneously baking both sides of a crust.

The upper crust forming and baking unit also consists of two elements, indicated in their entirety at 26 and 27, which are cooperatively related and movable relative to each other into open and closed positions, similar to that described for elements 10 and 11.

The lower element 26 forms the top surface of the top crust, and the forming means is concavous in form as shown at 28 to form a convexo-concave crust, and suitable indent or perforation forming elements 29 are fixed in this forming face to form the indents 30, and the peripheral edge 31 forms a trimming edge for excess dough and determines the diameter of the finished crust, the diameter of which is very slightly less than diameter 17, so as to fit snugly in the recess formed in the lower crust.

The upper element is spacedly complementary to the lower element, forming a completely confining baking chamber 32 when the elements are in closed position, the depending trimming member 33 forming a peripheral closure for this chamber and cooperating with edge 31.

Each element 26 and 27 has its own heating means, respectively 34 and 35 for simultaneously baking both sides of the crust, and the height of the chamber at 36 is exactly equal to the height 18.

The process is as follows:

The pie dough is first mixed, rolled to predetermined thickness, and discs cut therefrom of suitable diameter to form the respective crusts.

The machines or elements are maintained in heated condition for baking. The elements 10, 11, and 26, 27, are moved to open position and the discs of rolled dough laid over the respective lower forming members 14 and 28 as shown in Fig. 5, showing a disc 37 laid in position. The disc will sag as shown and partly conform to the forming member.

The top elements 10 and 26 are then lowered, and upon contact with the dough, are permitted to settle under the influence of gravity, the dough being first formed approximately to shape by the oven or baking chamber walls, and also approximately form the indents as to depth, this approximate or partial forming being due to the fact that the thickness of the dough or disc is less than the height of the oven, but such as to fully crowd the oven or baking compartment by raising of the dough. The last portion of the closing movement trims the edge of the disc and severs the trimming at diametrically opposite points to clear the outside of the lower element, the upper element coming to rest against stops of some suitable type to assure the exact spacing between the walls of the oven.

The dough as formed first raises under the influence of the heat, being thereby urged into all corners and indents, and about perforation-forming studs and undulations, a sharp corner being formed at 39 and 31, thereby completing the forming operation during the baking process, therefore, the first forming is accomplished by the oven walls and final forming during the baking process.

Since the filling of the baking chamber is accomplished as also the final forming, by raising the dough in a completely confining baking chamber, and all operations are carried out simultaneously in and by a single means, the crusts are baked to exact form, size and color, and the top crust will snugly fit in the recess formed by the supporting ledge 41 and annular wall 42, and the top surface 43 of the top crust will form an unbroken continuation with the top surface 44 of the rim of the lower crust.

After baking, these top crusts and bottom crusts may be shipped to remote points and stored for future use, and due to the specific process, they will remain fresh and crisp over a long period.

A suitable supply and variety of canned fillers is also maintained, whereby pies may be assembled on order, by emptying the contents of a can of the desired kind of filler into a bottom crust and laying the top crust in position in the recess.

Since all fillers contain moisture, this moisture acts on the concave under surface of the top crust, causing this surface to expand slightly and lock the top crust in the recess, due to the initial close fit, while the convex top crust provides the necessary self-supporting stability to maintain the top crust out of contact with the filler 45.

In addition, non-edible containers, such as metal, having the same form and size as the bottom crust are provided for making meat pies, and when using the bottom crusts alone for making uncovered pies, the wall 42 of the recess forms a terminal-indicating line for topping.

It will be understood, that variations in the process or product, which variations are consistent with the appended claims, may be resorted to, without detracting from the spirit or scope of the invention, or sacrificing any of the advantages thereof.

I claim:

1. The process of making pie crusts consisting in rolling pie dough to predetermined thickness, and forming, trimming, raising and baking the dough in one continuing operation in a completely confining oven having the internal form and dimensions of the finished product, and with a predetermined distance maintained between adjacent walls during the baking process sufficiently greater than the thickness of the dough to permit raising of the dough to a predetermined degree only, whereby the crust is formed by raising to the exact internal conformation of the oven.

2. The art of making pies consisting in forming, raising and baking a top crust in a restricted first oven of greater internal volume than the volume of the raw dough in a continuous operation to the form and diameter of the oven, and forming, raising and baking a bottom crust with an annular recess to closely receive the top crust at will, in a restricted second oven of greater internal volume than the volume of the raw dough, in a continuous operation to the form and diameter of said second oven, and assembling said crusts and a filler at will.

3. The process of making pie crusts consisting in forming top crusts to approximate form and raising and baking said top crusts to exact diameter and form and peripheral thickness, and forming bottom crusts to approximate form and raising and baking said bottom crusts to exact diameter and form and with an annular recess in the rim portion thereof, with the depth of the recess equal to the peripheral thickness of the top crust and with the diameter of the recess closely receiving the top crust.

4. The process of making pie crusts assemblable at will consisting in rough forming, and raising, and baking, in a simultaneous and continuous process, top crusts to predetermined diameter and peripheral thickness and of convexo-concave form for self-support; and rough forming, and raising, and baking, in a simultaneous process, bottom crusts with shell portion and integral rim portion with an annular intervening recess receiving and fitting the peripheral edge of the top crust.

5. The process of making pies consisting in rolling pie dough to predetermined thickness; rough forming, trimming, raising and baking portions of the dough in a continuing operation in two completely confining ovens and maintaining a spacing between the walls of the ovens to permit partial raising of the dough to form the dough to the exact internal form, diameter and volume of the ovens to form respectively, a top crust, and a bottom crust with the bottom crust formed with a rim portion provided with an annular recess terminating in an encompassing shoulder of predetermined height and with the top crust formed to dome shape and with a diameter and peripheral thickness equal respectively to the diameter and height of the shoulder, filling the bottom crust with a filler containing moisture, placing the baked top crust over the filler and supported on the bottom wall of the recess and within the confines of the shoulder, moisture evaporating from the filler and absorbed by the top crust causing expansion of the dome shaped top crust and causing the top crust to be secured against the shoulder while the dome shape prevents collapse of the top crust, whereby the pie is assemblable at will without additional baking or heating and the appearance of a normally baked pie is provided.

KENNETH E. BEMIS.